April 28, 1936.  J. K. DAVIDSON  2,038,719
INSECT ELECTROCUTING DEVICE
Filed Oct. 30, 1934
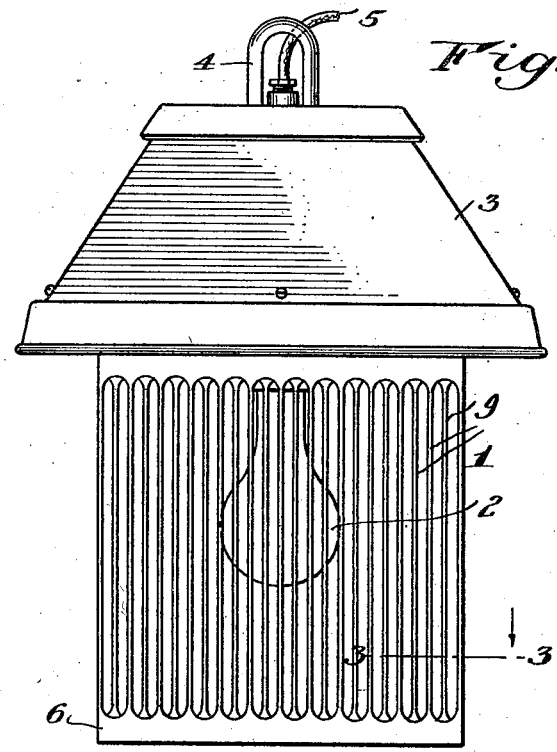
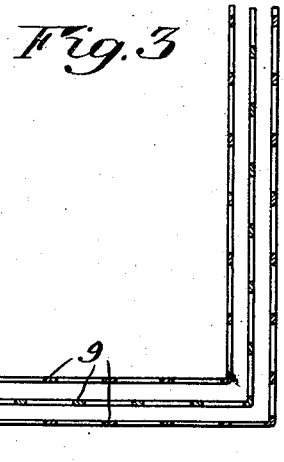
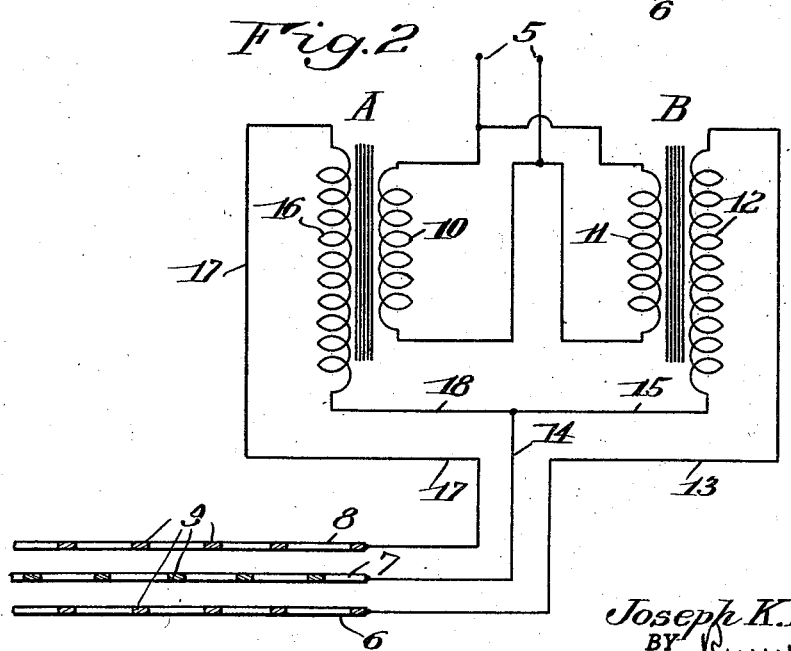
INVENTOR
Joseph K. Davidson
BY
his ATTORNEY Patented Apr. 28, 1936

2,038,719

UNITED STATES PATENT OFFICE 2,038,719

INSECT ELECTROCUTING DEVICE

Joseph K. Davidson, Rochester, N. Y., assignor, by mesne assignments, to Joseph K. Davidson, Rochester, N. Y.

Application October 30, 1934, Serial No. 750,642

4 Claims. (Cl. 43—112)

My present invention relates to electrical devices and more particularly to traps or killing stations for attracting and destroying flying and other insects by electrocution, such an apparatus being shown in all its details in the patent to W. F. Folmer et al., No. 1,848,614, dated March 8, 1932, for instance, and my invention has for its general object to provide an improved device of this character that will not so readily become clogged with the dead insect bodies and yet will effectively intercept a greater number of the winged variety. To these and other ends, the invention resides in certain improvements and combinations of parts, all as will be hereinafter more fully described, the novel features being pointed out in the claims at the end of this specification.

In the drawing:

Fig. 1 is a side elevation of an electrocuting outfit constructed in accordance with and illustrating one embodiment of my invention;

Fig. 2 is a diagrammatic plan of the electrical connections joined to a fragment of the electrodes in enlarged horizontal section, and Fig. 3 is an enlarged horizontal section taken on the line 3—3 of Fig. 1.

Similar reference numerals throughout the several views indicate the same parts.

Referring more particularly to the drawing, characteristics of the device in general described in detail in the prior patent referred to but constituting no part of this invention will be but briefly described. In the present embodiment, I indicates a cage, open at the bottom, surrounding a lure in the present form of a lamp 2. Both are suspended from a stage or platform surmounted and enclosed in a weather-tight manner by a dome 3, which in turn may be suspended by an eye 4 from a tree, porch or other object in the infested area. A lead wire from an ordinary lighting source is indicated at 5, which source supplies the lamp 2 on one shunt and the transformers, hereinafter described, on another, which transformers are conveniently housed and protected within the dome 3.

The transformers produce a high potential circuit in the cage 1, which is closed or arced by the insect bodies as they fly against it or light upon it. A moth, for instance, as any casual observer knows, flies round and round a light in circles the larger the circular path that can be intercepted by the killing surface, the more effective the latter will be. It is one feature of my invention, therefore, to make the cage 1 non-circular. I, preferably, make it square in horizontal section in Fig. 3. A moth flying about the shorter radius from the lamp will, therefore, be intercepted at the corners of the cage.

In the practice of my invention, the cage embodies three electrodes 6, 7 and 8 spaced from each other in parallelism leaving openings at the bottom through which the insect bodies reaching the interior of the cage wall may fall. Each electrode consists of suitably spaced parallel wires 9, which wires are staggered with reference to those of the adjoining group, as clearly shown in the sectional views. The relative spacing of these in all respects is such that when an insect strikes against any two in different adjacent groups, it will induce an arc or short circuit and be burned or destroyed. The bottom of the cage being open, as aforesaid, so that the insects can fly into the interior thereof, this may occur either between electrodes 6—7 or electrodes 8—7, though most are caught on the outside.

In thickly infested regions, where only two electrodes, such as 6 and 7, are used, the impingement of the insects against the cage is often so rapid that they ultimately entirely cover it due to the fact that they collectively consume so much current that they reduce the potential below the arcing and burning point. Insect wings are peculiarly and unexpectedly highly resistant to electric current and even though as high as 4000 volts is used, which is customary, a sufficient mass of bodies can overcome this current. With my triple electrode system, however, the cage keeps itself cleared for the following reasons and because of the following provisions:

I provide two transformers A and B instead of one. The charging sides 10 and 11 of these are in series in the supply circuit 5, as clearly appears in the figure without designating the connecting wires. The high tension side 12 of transformer B is in circuit with electrodes 6 and 7, as follows: wire 13 to 6; wires 14 and 15 from 7 back to 12 or 16. The high tension side 16 of transformer A is in circuit with electrodes 7 and 8, as follows: wire 17 to 8; wires 14 and 18 from 7 back to 12 or 16. It will thus be seen that intermediate electrode 7 can arc with either of the electrodes on one transformer circuit or the other. The result is that if clogging occurs between the wires 9 of electrodes 6 and 7, as would most frequently happen, because the outside of the cage collects far more than the inside, then arcing will occur between 7 and 8 and burn off the insect contact at 7 because the wing and body contacts at 7 inevitably reach partly toward 8. In like manner electrode 6 will come to the rescue, as it were, of the couple 7—8.

I claim as my invention:

1. In an insect electrocuting device, the combination with a pair of electrodes sufficiently spaced to intercept the insect and cause it to induce an arc between them, of a third electrode similarly spaced from one of the first mentioned electrodes but in a plane other than that defined by the latter, and two high tension circuits, one of which includes the first mentioned pair of electrodes and the other of which includes one of them and the third electrode.

2. In an insect electrocuting device, the combination with a pair of electrodes each consisting of a plurality of wires, those of one being sufficiently spaced from each other and from those of the other electrode to intercept the insect and cause it to induce an arc between the two electrodes, of a third electrode similarly constructed and arranged with respect to one of the first mentioned electrodes but in a plane other than that defined by the latter, and two high tension circuits, one of which includes the first mentioned pair of electrodes and the other of which includes one of them and the third electrode, the said electrode wires having a relatively staggered relationship as between the two planes.

3. In an insect electrocuting device, the combination with a pair of electrodes sufficiently spaced to intercept the insect and cause it to induce an arc between them, of a third electrode similarly spaced from one of the first mentioned electrodes but in a plane other than that defined by the latter, and two high tension circuits, one of which includes the first mentioned pair of electrodes and the other of which includes one of them and the third electrode, each electrode consisting of a plurality of continuous spaced wires forming a cage-like enclosure, the electrode common to both circuits being opposite to but not in the opening between the other two.

4. In an insect electrocuting device, the combination with a pair of electrodes sufficiently spaced to intercept the insect and cause it to induce an arc between them, of a third electrode similarly spaced from one of the first mentioned electrodes but in a plane other than that defined by the latter, and two high tension circuits, one of which includes the first mentioned pair of electrodes and the other of which includes one of them and the third electrode, the electrode common to both circuits being opposite to but not in the opening between the other two.

JOSEPH K. DAVIDSON.